(12) United States Patent
Elomari

(10) Patent No.: US 6,468,485 B1
(45) Date of Patent: Oct. 22, 2002

(54) USING ZEOLITE SSZ-60 FOR REDUCTION OF OXIDES OF NITROGEN IN A GAS STREAM

(75) Inventor: Saleh Elomari, Richmond, CA (US)

(73) Assignee: Chevron U.S.A. Inc., San Francisco, CA (US)

( * ) Notice: Subject to any disclaimer, the term of this patent is extended or adjusted under 35 U.S.C. 154(b) by 0 days.

(21) Appl. No.: 09/905,473

(22) Filed: Jul. 13, 2001

(51) Int. Cl.⁷ ................................................ C01B 21/20
(52) U.S. Cl. .................. 423/213.2; 423/213.5; 423/239.2

(58) Field of Search ............................ 423/213.2, 213.5, 423/239.2

(56) References Cited

U.S. PATENT DOCUMENTS 3,972,983 A * 8/1976 Ciric .......................... 423/705
5,433,933 A * 7/1995 Eshita et al. .............. 423/213.2

* cited by examiner

*Primary Examiner*—David Sample
(74) *Attorney, Agent, or Firm*—Richard J. Sheridan

(57) ABSTRACT

The present invention relates to new crystalline zeolite SSZ-60 and processes employing SSZ-60 as a catalyst.

4 Claims, No Drawings

USING ZEOLITE SSZ-60 FOR REDUCTION OF OXIDES OF NITROGEN IN A GAS STREAM

BACKGROUND OF THE INVENTION

1. Field of the Invention

The present invention relates to new crystalline zeolite SSZ-60 and processes employing SSZ-60 as a catalyst.

2. State of the Art

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new zeolites with desirable properties for gas separation and drying, hydrocarbon and chemical conversions, and other applications. New zeolites may contain novel internal pore architectures, providing enhanced selectivities in these processes.

Crystalline aluminosilicates are usually prepared from aqueous reaction mixtures containing alkali or alkaline earth metal oxides, silica, and alumina. Crystalline borosilicates are usually prepared under similar reaction conditions except that boron is used in place of aluminum. By varying the synthesis conditions and the composition of the reaction mixture, different zeolites can often be formed.

SUMMARY OF THE INVENTION

The present invention is directed to a family of crystalline molecular sieves with unique properties, referred to herein as "zeolite SSZ-60" or simply "SSZ-60". Preferably, SSZ-60 is obtained in its silicate, aluminosilicate, titanosilicate, vanadosilicate or borosilicate form. The term "silicate" refers to a zeolite having a high mole ratio of silicon oxide relative to aluminum oxide, preferably a mole ratio greater than 100, including zeolites comprised entirely of silicon oxide. As used herein, the term "aluminosilicate" refers to a zeolite containing both alumina and silica and the term "borosilicate" refers to a zeolite containing oxides of both boron and silicon.

In accordance with this invention, there is provided an improved process for the reduction of oxides of nitrogen contained in a gas stream in the presence of oxygen wherein said process comprises contacting the gas stream with a zeolite, the improvement comprising using as the zeolite a zeolite having a mole ratio greater than about 20 of an oxide of a first tetravalent element to an oxide of a second tetravalent element different from said first tetravalent element, trivalent element, pentavalent element or mixture thereof and having, after calcination, the X-ray diffraction lines of Table II. The zeolite may contain a metal or metal ions (such as cobalt, copper or mixtures thereof) capable of catalyzing the reduction of the oxides of nitrogen, and may be conducted in the presence of a stoichiometric excess of oxygen. In a preferred embodiment, the gas stream is the exhaust stream of an internal combustion engine.

DETAILED DESCRIPTION OF THE INVENTION

The present invention comprises a family of crystalline, large pore zeolites designated herein "zeolite SSZ-60" or simply "SSZ-60". As used herein, the term "large pore" means having an average pore size diameter greater than about 6.0 Angstroms, preferably from about 6.5 Angstroms to about 7.5 Angstroms.

In preparing SSZ-60 zeolites, a N-ethyl-N-(3,3,5-trimethylcyclohexyl)-pyrrolidinium cation or N-ethyl-N-(2,4,4-trimethylcyclopentyl)pyrrolidinium cation is used as a crystallization template. In general, SSZ-60 is prepared by contacting an active source of one or more oxides selected from the group consisting of monovalent element oxides, divalent element oxides, trivalent element oxides, and tetravalent element oxides with the N-ethyl-N-(3,3,5-trimethylcyclohexyl)-pyrrolidinium cation or N-ethyl-N-(2,4,4-trimethylcyclopentyl)pyrrolidinium cation templating agent. SSZ-60 is prepared from a reaction mixture having the composition shown in

TABLE A

| | Reaction Mixture | |
|---|---|---|
| | Typical | Preferred |
| $YO_2/W_aO_b$ | >20 | 30–70 |
| $OH^-/YO_2$ | 0.10–0.50 | 0.20–0.30 |
| $Q/YO_2$ | 0.05–0.50 | 0.10–0.20 |
| $M_{2/n}/YO_2$ | 0.02–0.40 | 0.10–0.25 |
| $H_2O/YO_2$ | 30–80 | 35–45 | wherein Y is silicon, germanium or a mixture thereof; W is aluminum, gallium, iron, boron, titanium, indium, vanadium or mixtures thereof; a is 1 or 2, and b is 2 when a is 1 (i.e., W is tetravalent) and b is 3 when a is 2 (i.e., W is trivalent); M is an alkali metal cation, alkaline earth metal cation or mixtures thereof; n is the valence of M (i.e., 1 or 2); and Q is a N-ethyl-N-(3,3,5-trimethylcyclohexyl)-pyrrolidinium cation or N-ethyl-N-(2,4,4-trimethylcyclopentyl) pyrrolidinium cation.

In practice, SSZ-60 is prepared by a process comprising:

(a) preparing an aqueous solution containing sources of at least one oxide capable of forming a crystalline molecular sieve and a N-ethyl-N-(3,3,5-trimethylcyclohexyl)-pyrrolidinium cation or N-ethyl-N-(2,4,4-trimethylcyclopentyl)pyrrolidinium cation having an anionic counterion which is not detrimental to the formation of SSZ-60;

(b) maintaining the aqueous solution under conditions sufficient to form crystals of SSZ-60; and (c) recovering the crystals of SSZ-60.

Accordingly, SSZ-60 may comprise the crystalline material and the templating agent in combination with metallic and non-metallic oxides bonded in tetrahedral coordination through shared oxygen atoms to form a cross-linked three dimensional crystal structure. The metallic and non-metallic oxides comprise one or a combination of oxides of a first tetravalent element(s), and one or a combination of a second tetravalent element(s) different from the first tetravalent element(s), trivalent element(s), pentavalent element(s) or mixture thereof. The first tetravalent element(s) is preferably selected from the group consisting of silicon, germanium and combinations thereof. More preferably, the first tetravalent element is silicon. The second tetravalent element (which is different from the first tetravalent element), trivalent element and pentavalent element is preferably selected from the group consisting of aluminum, gallium, iron, boron, titanium, indium, vanadium and combinations thereof. More preferably, the second trivalent or tetravalent element is aluminum or boron.

Typical sources of aluminum oxide for the reaction mixture include aluminates, alumina, aluminum colloids, aluminum oxide coated on silica sol, hydrated alumina gels such as $Al(OH)_3$ and aluminum compounds such as $AlCl_3$ and $Al_2(SO_4)_3$. Typical sources of silicon oxide include silicates, silica hydrogel, silicic acid, fumed silica, colloidal silica, tetra-alkyl orthosilicates, and silica hydroxides. Boron, as well as gallium, germanium, titanium, indium, vanadium and iron, can be added in forms corresponding to their aluminum and silicon counterparts.

A source zeolite reagent may provide a source of aluminum or boron. In most cases, the source zeolite also provides a source of silica. The source zeolite in its dealuminated or deboronated form may also be used as a source of silica, with additional silicon added using, for example, the conventional sources listed above. Use of a source zeolite reagent as a source of alumina for the present process is more completely described in U.S. Pat. No. 5,225,179, issued Jul. 6, 1993 to Nakagawa entitled "Method of Making Molecular Sieves", the disclosure of which is incorporated herein by reference.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The templating agent may be used to provide hydroxide ion. Thus, it may be beneficial to ion exchange, for example, the halide for hydroxide ion, thereby reducing or eliminating the alkali metal hydroxide quantity required. The alkali metal cation or alkaline earth cation may be part of the as-synthesized crystalline oxide material, in order to balance valence electron charges therein.

The reaction mixture is maintained at an elevated temperature until the crystals of the SSZ-60 zeolite are formed. The hydrothermal crystallization is usually conducted under autogenous pressure, at a temperature between 100° C. and 200° C., preferably between 135° C. and 160° C. The crystallization period is typically greater than 1 day and preferably from about 3 days to about 20 days.

Preferably, the zeolite is prepared using mild stirring or agitation.

During the hydrothermal crystallization step, the SSZ-60 crystals can be allowed to nucleate spontaneously from the reaction mixture. The use of SSZ-60 crystals as seed material can be advantageous in decreasing the time necessary for complete crystallization to occur. In addition, seeding can lead to an increased purity of the product obtained by promoting the nucleation and/or formation of SSZ-60 over any undesired phases. When used as seeds, SSZ-60 crystals are added in an amount between 0.1 and 10% of the weight of silica used in the reaction mixture.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-60 zeolite crystals. The drying step can be performed at atmospheric pressure or under vacuum.

SSZ-60 as prepared has a mole ratio of an oxide selected from silicon oxide, germanium oxide and mixtures thereof to an oxide selected from aluminum oxide, gallium oxide, iron oxide, boron oxide, titanium oxide, indium oxide, vanadium oxide and mixtures thereof greater than about 20; and has, after calcination, the X-ray diffraction lines of Table II below. SSZ-60 further has a composition, as synthesized (i.e., prior to removal of the templating agent from the zeolite) and in the anhydrous state, in terms of mole ratios, shown in Table B below.

TABLE B

| As-Synthesized SSZ-60 | |
|---|---|
| $YO_2/W_cO_d$ | >20 |
| $M_{2/n}YO_2$ | 0.01–0.03 |
| $Q/YO_2$ | 0.02–0.05 | where Y, W, M, n and Q are as defined above, and c is 1 or 2; d is 2 when c is 1 (i.e., W is tetravalent) or d is 3 or 5 when c is 2 (i.e., d is 3 when W is trivalent or 5 when W is pentavalent).

SSZ-60 can be made essentially aluminum free, i.e., having a silica to alumina mole ratio of ∞. A method of increasing the mole ratio of silica to alumina is by using standard acid leaching or chelating treatments. However, essentially aluminum-free SSZ-60 can be synthesized directly using essentially aluminum-free silicon sources as the main tetrahedral metal oxide component, if boron is also present. SSZ-60 can also be prepared directly as either an aluminosilicate or a borosilicate.

Lower silica to alumina ratios may also be obtained by using methods which insert aluminum into the crystalline framework. For example, aluminum insertion may occur by thermal treatment of the zeolite in combination with an alumina binder or dissolved source of alumina. Such procedures are described in U.S. Pat. No. 4,559,315, issued on Dec. 17, 1985 to Chang et al.

It is believed that SSZ-60 is comprised of a new framework structure or topology which is characterized by its X-ray diffraction pattern. SSZ-60 zeolites, as-synthesized, have a crystalline structure whose X-ray powder diffraction pattern exhibit the characteristic lines shown in Table I and is thereby distinguished from other zeolites.

TABLE I

| As-Synthesized SSZ-60 | | |
|---|---|---|
| Two Theta (deg.)[a] | d-spacing (Å) | Relative Intensity[b] |
| 6.4 | 13.8 | M |
| 7.6 | 11.6 | M |
| 8.0 | 11.0 | S |
| 10.3 | 8.56 | M |
| 15.2 | 5.82 | W |
| 17.4 | 5.09 | M |
| 19.3 | 4.60 | M |
| 20.5 | 4.33 | S |
| 22.4 | 3.97 | VS |
| 24.2 | 3.69 | M |
| 27.2 | 3.28 | M |
| 28.1 | 3.17 | W |
| 35.9 | 2.50 | M |

[a]±0.2
[b]The X-ray patterns provided are based on a relative intensity scale in which the strongest line in the X-ray pattern is assigned a value of 100: W (weak) is less than 20; M (medium) is between 20 and 40; S (strong) is between 40 and 60; VS (very strong) is greater than 60.

Table IA below shows the X-ray powder diffraction lines for as-synthesized SSZ-60 including actual relative intensities.

TABLE IA

| Two Theta[a] | d-spacing (Å) | Intensity I/Io × 100 |
|---|---|---|
| 6.39 | 13.83 | 38 |
| 7.64 | Sh 11.56 | 24 |
| 7.98 | 11.07 | 49 |

TABLE IA-continued

| Two Theta[a] | d-spacing (Å) | Intensity I/Io × 100 |
|---|---|---|
| 10.29 | 8.588 | 19 |
| 13.40 | 6.604 | 6 |
| 15.19 | 5.828 | 12 |
| 17.44 | 5.080 | 36 |
| 19.30 | 4.596 | 36 |
| 20.53 | 4.322 | 57 |
| 21.49 | 4.132 | 13 |
| 22.36 | 3.973 | 100 |
| 23.39 | 3.801 | 16 |
| 24.12 Sh | 3.687 | 18 |
| 24.23 | 3.670 | 25 |
| 25.22 | 3.528 | 13 |
| 25.95 | 3.431 | 15 |
| 26.78 Sh | 3.327 | 12 |
| 27.16 | 3.281 | 27 |
| 28.08 | 3.176 | 19 |
| 29.05 | 3.071 | 6 |
| 30.72 | 2.908 | 6 |
| 31.34 | 2.852 | 5 |
| 32.65 | 2.740 | 6 |
| 33.63 | 2.663 | 5 |
| 35.87 | 2.594 | 31 |
| 37.47 | 2.502 | 4 |
| 39.58 | 2.398 | 4 |

[a]±0.2

After calcination, the SSZ-60 zeolites have a crystalline structure whose X-ray powder diffraction pattern include the characteristic lines shown in Table II:

TABLE II

Calcined SSZ-60

| Two Theta (deg.)[a] | d-spacing (Å) | Relative Intensity |
|---|---|---|
| 6.4 | 13.8 | VS |
| 7.6 | 11.6 | S |
| 8.0 | 11.0 | VS |
| 10.25 | 8.62 | S |
| 15.1 | 5.86 | W |
| 17.5 | 5.06 | W |
| 19.2 | 4.62 | M |
| 20.4 | 4.35 | M |
| 22.3 | 3.98 | S |
| 24.2 | 3.67 | W |
| 27.1 | 3.29 | W |
| 28.0 | 3.18 | W |
| 35.7 | 2.51 | W |

[a]±0.2

Table IIA below shows the X-ray powder diffraction lines for calcined SSZ-60 including actual relative intensities.

TABLE IIA

| Two Theta (deg.)[a] | d-spacing (Å) | Intensity I/Io × 100 |
|---|---|---|
| 6.36 | 13.88 | 100 |
| 7.63 Sh | 11.58 | 44 |
| 7.98 | 11.07 | 76 |
| 10.25 | 8.625 | 48 |
| 15.11 | 5.860 | 5 |
| 16.12 | 5.495 | 4 |
| 17.47 | 5.073 | 10 |
| 18.07 | 4.904 | 2 |
| 19.20 | 4.620 | 40 |
| 19.70 | 4.503 | 2 |
| 20.44 | 4.342 | 39 |
| 22.28 | 3.987 | 64 |
| 23.32 | 3.811 | 15 |
| 24.19 | 3.676 | 14 |
| 25.17 | 3.536 | 9 |
| 25.86 | 3.442 | 12 |
| 26.59 | 3.349 | 10 |
| 27.11 | 3.286 | 13 |
| 28.00 | 3.185 | 6 |
| 29.03 | 3.074 | 4 |
| 30.56 | 2.923 | 3 |
| 31.32 | 2.854 | 5 |
| 32.57 | 2.747 | 4 |
| 33.53 | 2.671 | 4 |
| 35.70 | 2.513 | 18 |

[a]±0.2

The X-ray powder diffraction patterns were determined by standard techniques. The radiation was the K-alpha/doublet of copper. The peak heights and the positions, as a function of 2θ where θ is the Bragg angle, were read from the relative intensities of the peaks, and d, the interplanar spacing in Angstroms corresponding to the recorded lines, can be calculated.

The variation in the scattering angle (two theta) measurements, due to instrument error and to differences between individual samples, is estimated at ±0.20 degrees.

The X-ray diffraction pattern of Table I is representative of "as-synthesized" or "as-made" SSZ-60 zeolites. Minor variations in the diffraction pattern can result from variations in the silica-to-alumina or silica-to-boron mole ratio of the particular sample due to changes in lattice constants. In addition, sufficiently small crystals will affect the shape and intensity of peaks, leading to significant peak broadening.

Representative peaks from the X-ray diffraction pattern of calcined SSZ-60 are shown in Table II. Calcination can also result in changes in the intensities of the peaks as compared to patterns of the "as-made" material, as well as minor shifts in the diffraction pattern. The zeolite produced by exchanging the metal or other cations present in the zeolite with various other cations (such as $H^+$ or $NH_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

Crystalline SSZ-60 can be used as-synthesized, but preferably will be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica to alumina mole ratio. The zeolite can also be steamed; steaming helps stabilize the crystalline lattice to attack from acids.

The zeolite can be used in intimate combination with hydrogenating components, such as tungsten, vanadium molybdenum, rhenium, nickel cobalt, chromium, manganese, or a noble metal, such as palladium or platinum, for those applications in which a hydrogenation-dehydrogenation function is desired.

Metals may also be introduced into the zeolite by replacing some of the cations in the zeolite with metal cations via standard ion exchange techniques (see, for example, U.S. Pat. No. 3,140,249 issued Jul. 7, 1964 to Plank et al.; U.S. Pat. No. 3,140,251 issued Jul. 7, 1964 to Plank et al.; and U.S. Pat. No. 3,140,253 issued Jul. 7, 1964 to Plank et al.). Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be ion-exchanged into the SSZ-60. The zeolite can also be impregnated with the metals, or, the metals can be physically and intimately admixed with the zeolite using standard methods known to the art.

Typical ion-exchange techniques involve contacting the synthetic zeolite with a solution containing a salt of the desired replacing cation or cations. Although a wide variety of salts can be employed, chlorides and other halides, acetates, nitrates, and sulfates are particularly preferred. The zeolite is usually calcined prior to the ion-exchange procedure to remove the organic matter present in the channels and on the surface, since this results in a more effective ion exchange. Representative ion exchange techniques are disclosed in a wide variety of patents including U.S. Pat. No. 3,140,249 issued on Jul. 7, 1964 to Plank et al.; U.S. Pat. No. 3,140,251 issued on Jul. 7, 1964 to Plank et al.; and U.S. Pat. No. 3,140,253 issued on Jul. 7, 1964 to Plank et al.

Following contact with the salt solution of the desired replacing cation, the zeolite is typically washed with water and dried at temperatures ranging from 65° C. to about 200° C. After washing, the zeolite can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of SSZ-60, the spatial arrangement of the atoms which form the basic crystal lattice of the zeolite remains essentially unchanged.

SSZ-60 can be formed into a wide variety of physical shapes. Generally speaking, the zeolite can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

SSZ-60 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

SSZ-60 can also be used as an adsorbent with high selectivities based on molecular sieve behavior and also based upon preferential hydrocarbon packing within the pores.

SSZ-60 may be used for the catalytic reduction of the oxides of nitrogen in a gas stream. Typically, the gas stream also contains oxygen, often a stoichiometric excess thereof. Also, the SSZ-60 may contain a metal or metal ions within or on it which are capable of catalyzing the reduction of the nitrogen oxides. Examples of such metals or metal ions include copper, cobalt and mixtures thereof.

One example of such a process for the catalytic reduction of oxides of nitrogen in the presence of a zeolite is disclosed in U.S. Pat. No. 4,297,328, issued Oct. 27, 1981 to Ritscher et al., which is incorporated by reference herein. There, the catalytic process is the combustion of carbon monoxide and hydrocarbons and the catalytic reduction of the oxides of nitrogen contained in a gas stream, such as the exhaust gas from an internal combustion engine. The zeolite used is metal ion-exchanged, doped or loaded sufficiently so as to provide an effective amount of catalytic copper metal or copper ions within or on the zeolite. In addition, the process is conducted in an excess of oxidant, e.g., oxygen.

EXAMPLES

The following examples demonstrate but do not limit the present invention. The templating agents indicated in Table C below are used in these examples.

TABLE C

N-ethyl-N-(3,3,5-trimethylcyclohexyl)pyrrolidinium cation

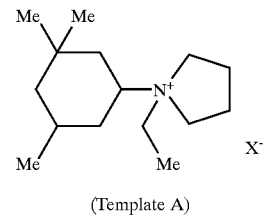

(Template A)

N-ethyl-N-(2,4,4-trimethylcyclopentyl)pyrrolidinium cation

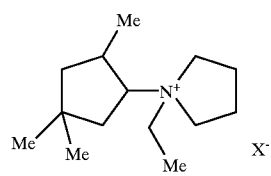

(Template B)

The anion (X⁻) associated with the cation may be any anion which is not detrimental to the formation of the zeolite. Representative anions include halogen, e.g., fluoride, chloride, bromide and iodide, hydroxide, acetate, sulfate, tetrafluoroborate, carboxylate, and the like. Hydroxide is the most preferred anion.

Example 1

Synthesis of N-ethyl-N-(3,3,5-trimethylcyclohexyl) pyrrolidinium Cation (Template A)

Synthesis of N-(3,3,5-trimethylyyclohexyl)pyrrolidine

The structure-directing agent (SDA) was synthesized using the reaction sequence described in the scheme bellow.

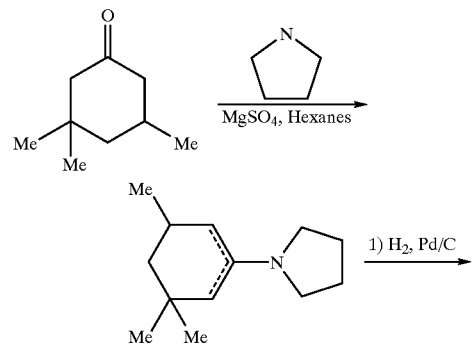

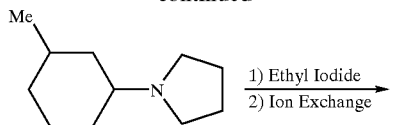

1) Ethyl Iodide
2) Ion Exchange

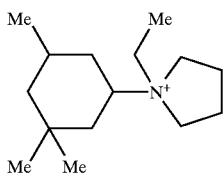

Synthesis of the parent amine N-(3,3,5-trimethylcyclohexyl) pyrrolidine

In a 3-liter three neck flask a 150 gm (2.13 mole) of pyrrolidine, 100 gm of 3,5,5-trimethylcyclohexanone (0.71 mole) were mixed in a and 1500 ml anhydrous hexane. To the resulting solution, 150 gm (1.25 mole) of anhydrous magnesium sulfate were added and the mixture was mechanically stirred and heated at reflux (the reaction was monitored by NMR analysis) for 132 hrs. The reaction mixture was filtered through a fritted glass funnel. The filtrate was concentrated under reduced pressure on a rotary evaporator to give 133 gm of an isomeric mixture of the desired enamine as was indicated by $^1$H-NMR and $^{13}$C-NMR analysis [(3,3,5-trimethylcyclohex-enyl)pyrrolidine and (3,3,5-trimethylcyclohex-enyl)pyrrolidine]. Saturation of the enamine mixture, to give N-(3,5,5-trimethylcyclohexyl)pyrrolidine, was accomplished in quantitative yield by hydrogenation in ethanol at a 55 psi pressure of hydrogen gas in the presence of 10% Pd on activated carbon.

Quaternization of N-(3,3,5-trimethylcyclohexyl) pyrrolidine (Synthesis of N-ethyl-N-(3,3,5-trimethycyclohexyl)pyrrolidinium Iodide)

To a solution of 131 gm (0.67 mole) of N-(3,3,5-trimethylcyclohexyl)pyrrolidine in 1000 ml anhydrous methanol, 210 gm (1.34 mole) of ethyl iodide were added. The reaction was mechanically stirred for 3 days at room temperature. Then, an additional equivalent of ethyl iodide and one equivalent (67.7 gm; 0.0.67 mole) of potassium bicarbonate were added and the reaction was stirred at refluxing temperature for 72 hrs. The reaction mixture was concentrated under reduced pressure on a rotary evaporator to give an off-white-colored solid material. The solids were rinsed several times with chloroform and filtered after each rinse. All the chloroform rinses were combined and concentrated to give a white powder whose NMR data were acceptable for the desired quaternary ammonium iodide salt. The reaction afforded 218 gm (93% yield) of the product. The iodide salt was purified by re-crystallization in acetone and ether. This was done by completely dissolving the iodide salt in acetone and, then, the precipitation of the product was facilitated by addition of ethyl ether to, the acetone solution. Re-crystallization gave 211 gm of the product as white powder (pure by $^1$H and $^{13}$C-NMR NMR analysis).

Ion Exchange (Synthesis of N-ethyl-N-(3,3,5-trimethylcyclohexyl)pyrrolidinium Hydroxide)

To a solution of N-ethyl-N-(3,3,5-trimethylcyclohexyl) pyrrolidinium iodide salt (100 gm; 0.285 mole) in 350 ml water in a 1-liter plastic bottle, To the solution, 340 gm of Ion-Exchange Resin-OH (BIO RAD® AH1-X8) were added and the mixture was gently stirred at room temperature overnight. The mixture was filtered and the solids were rinsed with additional 75 ml of water. Titration analysis with 0.1N HCl gave a total yield of 0.215 mole of hydroxide ions (0.215 mole N-ethyl-N-(3,3,5-trimethylcyclohexyl) pyrrolidinium hydroxide).

Example 2
Synthesis of N-ethyl-N-(2,4,4-trimethylcyclopentyl) pyrrolidinium Cation (Template B)

N-ethyl-N-(2,4,4,-trimethylcyclopentyl)pyrrolidinium cation was synthesized using the synthetic scheme described above starting from pyrrolidine and 2,4,4-trimethylcyclopentanone.

Example 3

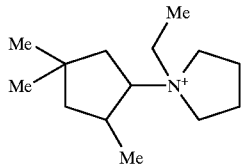

Example 3
Typical Preparation of Borosilicate SSZ-60 Starting SiO$_2$/B$_2$O$_3$=46

In a 23-cc Teflon liner, 5.93 gm of 0.50 M solution (aqueous) of the templating agent N-ethyl-N-(3,3,5-trimethycyclohexyl)pyrrolidinium hydroxide (3 mmol) were mixed with 1.2 gm of 1.0N NaOH (1.2 mmol) and 4.9 gm of de-ionized water. To this mixture, 0.06 gm of sodium borate decahydrate were added and stirred until completely dissolved. To this mixture, 0.9 gm of CABOSIL-M-5 (SiO$_2$) were added. The mixture was thoroughly stirred and the resulting gel was capped off and placed in steel Parr autoclave and heated in an oven at 160° C. while tumbling at 43 rpm. The progress of the reaction was monitored by Scanning Electron Microscopy at intervals of 6 days. Once completed, the reaction mixture (a clear liquid and fine solids settled to the bottom) was filtered through a fritted glass funnel. The collected solid was rinsed with water (1 liter) and air-dried overnight. The solids were further dried in an oven at 120° C. for 2hrs. The reaction yielded 0.85 gm of SSZ-60 as a white powder.

Analysis by XRD shows the product to be SSZ-60. The XRD data appears in Table III below.

TABLE III

| Two Theta | d-spacing (Å) | Intensity I/Io × 100 |
|---|---|---|
| 6.39 | 13.83 | 38 |
| 7.64 | Sh 11.56 | 24 |
| 7.98 | 11.07 | 49 |
| 10.29 | 8.588 | 19 |
| 13.40 | 6.604 | 6 |
| 15.19 | 5.828 | 12 |
| 17.44 | 5.080 | 36 |
| 19.30 | 4.596 | 36 |
| 20.53 | 4.322 | 57 |
| 21.49 | 4.132 | 13 |
| 22.36 | 3.973 | 100 |
| 23.39 | 3.801 | 16 |
| 24.12 | Sh 3.687 | 18 |
| 24.23 | 3.670 | 25 |
| 25.22 | 3.528 | 13 |
| 25.95 | 3.431 | 15 |
| 26.78 | Sh 3.327 | 12 |
| 27.16 | 3.281 | 27 |
| 28.08 | 3.176 | 19 |
| 29.05 | 3.071 | 6 |

TABLE III-continued

| Two Theta | d-spacing (Å) | Intensity I/Io × 100 |
|---|---|---|
| 30.72 | 2.908 | 6 |
| 31.34 | 2.852 | 5 |
| 32.65 | 2.740 | 6 |
| 33.63 | 2.663 | 5 |
| 35.87 | 2.594 | 31 |
| 37.47 | 2.502 | 4 |
| 39.58 | 2.398 | 4 |

Example 4

Calcination of SSZ-60

The material from Example 3 is calcined in the following manner. A thin bed of material is heated in a muffle furnace from room temperature to 120° C. at a rate of 1° C. per minute and held at 120° C. for three hours. The temperature is then ramped up to 540° C. at the same rate and held at this temperature for 5 hours, after which it is increased to 594° C. and held there for another 5 hours. A 50/50 mixture of air and nitrogen is passed over the zeolite at a rate of 20 standard cubic feet per minute during heating. The X-ray diffraction data for the product is provided in Table IV below.

TABLE IV

| Two Theta (deg.) | d-spacing (Å) | Intensity I/Io × 100 |
|---|---|---|
| 6.36 | 13.88 | 100 |
| 7.63 | Sh 11.58 | 44 |
| 7.98 | 11.07 | 76 |
| 10.25 | 8.625 | 48 |
| 15.11 | 5.860 | 5 |
| 16.12 | 5.495 | 4 |
| 17.47 | 5.073 | 10 |
| 18.07 | 4.904 | 2 |
| 19.20 | 4.620 | 40 |
| 19.70 | 4.503 | 2 |
| 20.44 | 4.342 | 39 |
| 22.28 | 3.987 | 64 |
| 23.32 | 3.811 | 15 |
| 24.19 | 3.676 | 14 |
| 25.17 | 3.536 | 9 |
| 25.86 | 3.442 | 12 |
| 26.59 | 3.349 | 10 |
| 27.11 | 3.286 | 13 |
| 28.00 | 3.185 | 6 |
| 29.03 | 3.074 | 4 |
| 30.56 | 2.923 | 3 |
| 31.32 | 2.854 | 5 |
| 32.57 | 2.747 | 4 |
| 33.53 | 2.671 | 4 |
| 35.70 | 2.513 | 18 |

Table V below show the results of attempts at making borosilicate SSZ-60 at varying $SiO_2/B_2O_3$ ratios. The results in Table V were obtained using the synthesis of example 3 by varying the amount of $Na_2B_4O_7 \cdot 10H_2O$ while keeping the amount of all was used as structure directing agent.

TABLE V

| $SiO_2/B_2O_3$ | XRD Results |
|---|---|
| 0 | SSZ-31 |
| 280 | SSZ-31 |
| 140 | SSZ-60 |
| 93.3 | SSZ-60 |
| 70 | SSZ-60 |
| 56 | SSZ-60 |

TABLE V-continued

| $SiO_2/B_2O_3$ | XRD Results |
|---|---|
| 46.7 | SSZ-60 |
| 40 | SSZ-60 |
| 35 | SSZ-60 |
| 31 | SSZ-60 |
| 28 | SSZ-60 |
| 25.5 | SSZ-60 |
| 23.5 | SSZ-60 |
| 20 | SSZ-60 |
| 18.7 | SSZ-60 & Cristobalite |
| 15.6 | SSZ-60 & Cristobalite |
| 14 | SSZ-60 & Cristobalite |

Example 5

Conversion of Boron-SSZ-60 to Aluminum-SSZ-60

Boron-SSZ-60 was converted to the more acidic Al-SSZ-60 by treatment with aluminum nitrate $((Al(NO_3)_3) \cdot 9H_2O)$ to exchange the boron in the framework of the zeolite with aluminum. Boron-SSZ-60 (as prepared in example 3 and calcined as in example 4) was heated at reflux in a 1.0 molar solution of boron was refluxed in a 1.0 molar solution of $Al(NO_3)_3 \cdot 9H_2O$ (40 ml/1 gm zeolite) overnight. The mixture was then filtered and thoroughly rinsed with water. The collected solids were rinsed with 0.05 N HCl and again with water to remove any residual aluminum nitrate. The solids were air-dried overnight and calcined at 540° C. for 5 hrs to give the proton form of the aluminum version of SSZ-60.

Example 6

$NH_4$ Exchange

Ion exchange of calcined SSZ-60 material (prepared in Example 3) is performed using $NH_4NO_3$ to convert the zeolite from its $Na^+$ form to the $NH_4^+$ form, and, ultimately, the $H^+$ form. Typically, the same mass of $NH_4NO_3$ as zeolite is slurried in water at a ratio of 25–50:1 water to zeolite. The exchange solution is heated at 95° C. for 2 hours and then filtered. This procedure can be repeated up to three times. Following the final exchange, the zeolite is washed several times with water and dried. This $NH_4^+$ form of SSZ-60 can then be converted to the $H^+$ form by calcination (as described in Example 9) to 540° C.

Example 7

Constraint Index Determination

The hydrogen form of the zeolite of Example 3 (after treatment according to Examples 4 and 5) is pelletized at 2–3 KPSI, crushed and meshed to 20–40, and then >0.50 gram is calcined at about 540° C. in air for four hours and cooled in a desiccator. 0.50 Gram is packed into a ⅜ inch stainless steel tube with alundum on both sides of the zeolite bed. A Lindburg furnace is used to heat the reactor tube. Helium is introduced into the reactor tube at 10 cc/min. and at atmospheric pressure. The reactor is heated to about 315° C., and a 50/50 (w/w) feed of n-hexane and 3-methylpentane is introduced into the reactor at a rate of 8 µl/min. Feed delivery is made via a Brownlee pump. Direct sampling into a gas chromatograph begins after 10 minutes of feed introduction. The Constraint Index value is calculated from the gas chromatographic data using methods known in the art, and is found to be 0.7, which appears to be constant with time. At 315° C. and 10 minutes on-stream, feed conversion was greater than 33%.

Example 8
Hydrocracking of n-Hexadecane

A sample of SSZ-60 as prepared in example 3 was treated as in examples 4 and 5. Then a sample was slurried in water and the pH of the slurry was adjusted to a pH of ~10 with dilute ammonium hydroxide. To the slurry was added a solution of $Pd(NH_3)_4(NO_3)_2$ at a concentration which would provide 0.5 wt. % Pd with respect to the dry weight of the zeolite sample. This slurry was stirred for 48 hours at 100° C. After cooling, the slurry was filtered through a glass frit, washed with de-ionized water, and dried at 100° C. The catalyst was then calcined slowly up to 900° F. in air and held there for three hours.

The calcined catalyst was pelletized in a Carver Press and crushed to yield particles with a 20/40 mesh size range. Sized catalyst (0.5 g) was packed into a ¼" OD tubing reactor in a micro unit for n-hexadecane hydroconversion. Table VI gives the run conditions and the products data for the hydrocracking test on n-hexadecane. After the catalyst was tested with n-hexadecane, it was titrated using a solution of butyl amine in hexane. The temperature was increased and the conversion and product data evaluated again under titrated conditions. The results shown in Table VI show that SSZ-60 is effective as a hydrocracking catalyst.

TABLE VI

| Temperature | 599° F. |
|---|---|
| WHSV | 1.55 |
| PSIG | 1200 |
| Titrated | No |
| n-16, % Conversion | 99.3 |
| Hydrocracking Conversion, % | 70.6 |
| Isomerization Selectivity, % | 28.9 |
| C4⁻, % | 9.3 |

TABLE VI-continued

| Temperature | 599° F. |
|---|---|
| $C_5 + C_6$,% | 20.7 |
| C4 i/n | 2.34 |
| C5 i/n | 2.67 |
| C6 i/n | 2.25 |
| C7 i/n | 2.51 |
| C8 i/n | 3.32 |
| C9 i/n | 3.77 |
| C10 i/n | 4.50 |
| C11 i/n | 4.76 |
| C12 i/n | 5.65 |

What is claimed is:

1. In a process for the reduction of oxides of nitrogen contained in a gas stream in the presence of oxygen wherein said process comprises contacting the gas stream with a zeolite, the improvement comprising using as the zeolite a zeolite having a mole ratio greater than about 20 of an oxide of a first tetravalent element to an oxide of a second tetravalent element which is different from said first tetravalent element, trivalent element, pentavalent element or mixture thereof and having, after calcination, the X-ray diffraction lines of Table II.

2. The process of claim 1 wherein said zeolite contains a metal or metal ions capable of catalyzing the reduction of the oxides of nitrogen.

3. The process of claim 2 wherein the metal is copper, cobalt or mixtures thereof.

4. The process of claim 2 wherein the gas stream is the exhaust stream of an internal combustion engine.

* * * * *